(12) United States Patent
Bakhturina et al.

(10) Patent No.: US 12,230,245 B2
(45) Date of Patent: Feb. 18, 2025

(54) TEXT NORMALIZATION AND INVERSE TEXT NORMALIZATION USING WEIGHTED FINITE-STATE TRANSDUCERS AND NEURAL LANGUAGE MODELS

(71) Applicant: Nvidia Corporation, Santa Clara, CA (US)

(72) Inventors: Evelina Bakhturina, Santa Clara, CA (US); Yang Zhang, New York, NY (US); Boris Ginsburg, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 262 days.

(21) Appl. No.: 17/900,310

(22) Filed: Aug. 31, 2022

(65) Prior Publication Data

US 2024/0071366 A1    Feb. 29, 2024

(51) Int. Cl.
| | |
|---|---|
| *G06F 17/00* | (2019.01) |
| *G06F 40/40* | (2020.01) |
| *G10L 13/047* | (2013.01) |
| *G10L 13/08* | (2013.01) |

(52) U.S. Cl.
CPC .............. *G10L 13/08* (2013.01); *G06F 40/40* (2020.01); *G10L 13/047* (2013.01); *G10L 2013/083* (2013.01)

(58) Field of Classification Search
None
See application file for complete search history.

(56) References Cited

U.S. PATENT DOCUMENTS

2020/0042837 A1 *  2/2020  Skinner ................. H04L 63/102
2020/0118040 A1 *  4/2020  Dey ....................... G06N 20/00

FOREIGN PATENT DOCUMENTS

| CN | 109033478 A | * | 12/2018 | ........... G06F 40/289 |
| CN | 110999228 A | * | 4/2020 | ........... G06F 3/0484 |
| CN | 112395878 A | * | 2/2021 | ........... G06F 16/335 |
| CN | 113988049 A | * | 1/2022 | |
| EP | 3745242 A1 | * | 12/2020 | |

\* cited by examiner

*Primary Examiner* — Shreyans A Patel
(74) *Attorney, Agent, or Firm* — Hogan Lovells US LLP

(57) ABSTRACT

Systems and methods provide for text normalization or inverse text normalization using a hybrid language system that combines rule-based processing with neural or learned processing. For example, a hybrid rule-based and neural approach identifies semiotic tokens within a textual input and generates a set of potential plain-text conversions of the semiotic tokens. The plain-text conversions are weighted and evaluated by a trained language model that rescores the plain-text conversion based on context to identify a highest scoring plain-text conversion for further processing within a language system pipeline.

20 Claims, 13 Drawing Sheets

TEXT NORMALIZATION AND INVERSE TEXT NORMALIZATION USING WEIGHTED FINITE-STATE TRANSDUCERS AND NEURAL LANGUAGE MODELS

BACKGROUND

Conversational artificial intelligence (AI) systems, including various speech-to-text or text-to-speech systems, receive an input and then provide an associated output. Various pre-processing steps may occur prior to the final conversion to-text or to-speech, which may include a normalization step to prepare different inputs for conversion. Often, these normalization approaches are rule-based in that they are hard-coded and particular for certain models and/or languages. However, rule-based approaches are often unable to resolve contextual ambiguities in text without high levels of complexity, linguistic expertise, and time to develop different sets of rules. The problems of rule-based approaches may be more noticeable when the inputs and/or outputs include combinations of letters, numbers, and symbols. As a result, these specific models can provide incorrect outputs, making them unsuitable for a variety of applications.

BRIEF DESCRIPTION OF THE DRAWINGS

Various embodiments in accordance with the present disclosure will be described with reference to the drawings, in which.

DETAILED DESCRIPTION

Approaches in accordance with various embodiments overcome these and other deficiencies by providing a text normalization model and an inverse text normalization model that may employ a hybrid approach (e.g., rule-based and neural) that may be used with various text-to-speech (TTS) and/or speech-to-text (STT) applications. As such, the text normalization and/or inverse text normalization models may include, at least in part, a rule-based and a neural approach to identify one or more portions of an input, determine potential conversions of the one or more portions of the input, weight the potential conversions, and select a potential conversion to generate a modified output of the input for inclusion with the remainder of the TTS or STT pipelines. Various embodiments may be incorporated as a pre-processing step within TTS and/or STT pipelines.

In at least one embodiment, the pre-processing text normalization (TN) operation for the TTS models or the post-processing inverse text normalization (ITN) operation for the STT models may incorporate both a rule-based approach (e.g., weighted finite-state transducers) model along with a neural language model (LM) to normalize text that may include combinations of letters, numbers, and symbols. An input that includes a mixture of letters, numbers, and symbols may not be accurately normalized because different combinations of numbers and symbols could mean different things, based on context. Some solutions try to use only a rule-based approach, but these rules must be hand-coded for each scenario, which limits their applicability across different languages and may still be insufficient where context is not provided for how to handle the input. Other solutions use a pure neural approach, but these approaches are often hard to scale due to the lack of labeled data required for training the neural models.

Various embodiments of the present disclosure combine both the rule-based and LM approaches to take an input and generate one or more potential outputs. The outputs may be sorted by class or by a particular category, with only a single output being provided for a particular category, in certain non-limiting embodiments. This set of outputs is weighted and may then be pruned to eliminate the highest weights or weights that exceed a threshold. If an outputs contains multiple ambiguous converted semiotic tokens, modifications where all but one semiotic token are masked out may be generated. The remaining outputs may then be provided to a trained LM, which may evaluate the options based on context to re-score and select a final option, which may then be passed through the TTS system for further processing. Embodiments may be used to receive a mixed input (e.g., an input that includes a combination of text, symbols, numbers, etc.) and/or to generate a mixed output (e.g., an output that includes a combination of text, symbols, numbers, etc.).

Figure 1A:
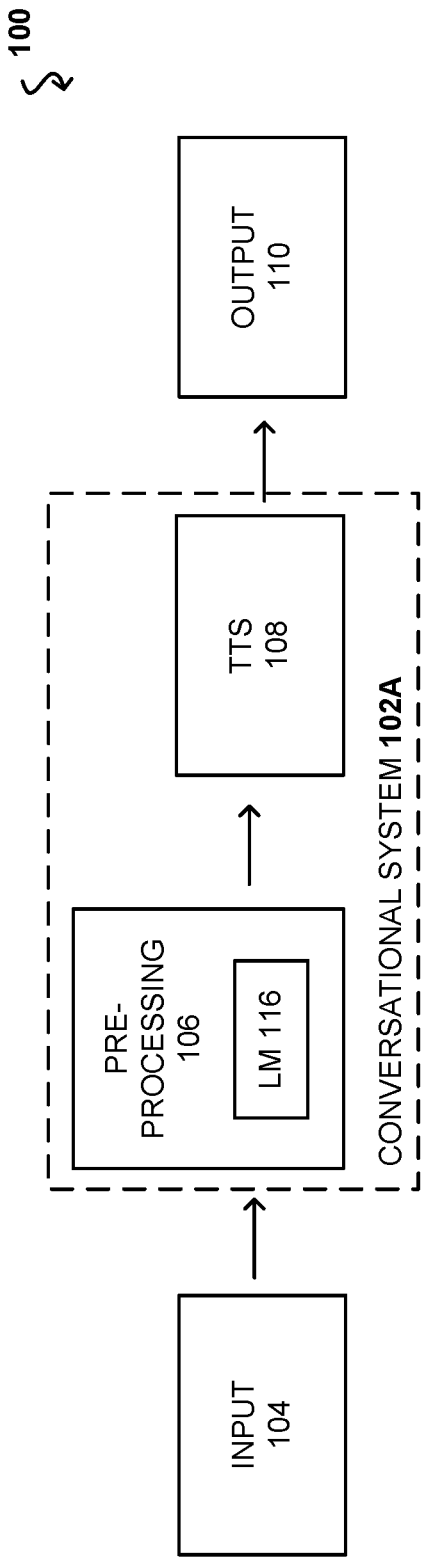
FIG. 1A illustrates an example of an environment for a language system, according to at least one embodiment.

FIG. 1A illustrates an example environment 100 that can be used to provide such functionality in accordance with at least one embodiment. In this example, the environment may be associated with one or more conversational systems 102A, which may include different processing capabilities to receive an input 104 in the form of a textual input for a TTS pipeline. It should be appreciated that the input may also include an audio input, a video input, an image input, or the like. In various embodiments, the input may be a converted input (e.g., audio converted to text, images converted to text, video converted to text, etc.), or a combination thereof. The conversational system 102A may include one or more different subsets of capabilities that may, as a whole, be referred to as the conversational system 102A. It should be appreciated that one or more of these components may not be part of the conversational system 102A, but may be accessible by or be in communication with the conversational system 102A, for example by one or more networks.

Moreover, the conversational system 102A may further be integrated into or associated with one or more SDKs for building speech AI applications, such as Riva from NVIDIA Corporation or with various other deep learning applications, including but not limited to Omniverse from NVIDIA Corporation or DeepStream SDK from NVIDIA Corporation.

In this example, the conversational system 102A receives the input 104. The input 104 may be a textual input, an auditory input, a video input, an image input, or some combination thereof. It should be appreciated that the input 104 may be undergo one or more processing or preparation operations prior to, or as part of, the conversational system 102A. By way of example, the input 104 may be received at a pre-processing engine 106 that may include tokenization, lemmatization, stemming, and/or other processes to prepare the input 104 for evaluation and processing within one or more pipelines.

Figure 1B:
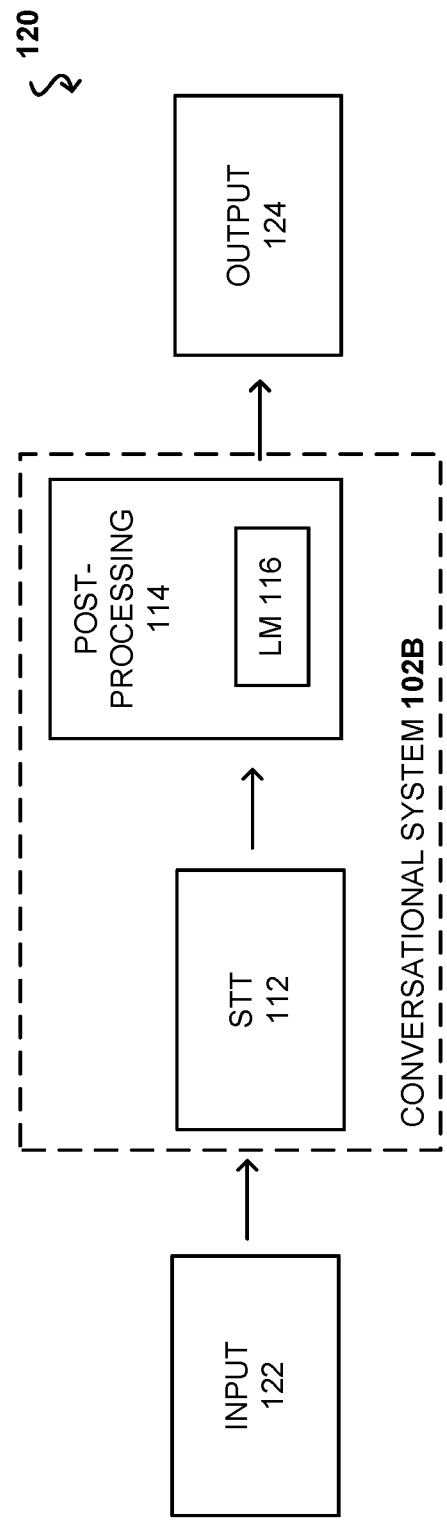
FIG. 1B illustrates an example of an environment for a language system, according to at least one embodiment.

In various embodiments, the input 104 may be a textual input, such as a phrase or sentence provided by a user, a phrase or sentence extracted from a block of text, a phrase or sentence extracted from an image (e.g., using optical character recognition (OCR)), a phrase or sentence extracted from a frame of a video sequence, a phrase or sentence converted from an audio input, or the like. The input 104 may be a mixed input, which may include letters, numbers, characters, and/or the like. For example, the input 104 may include a combination of letters and numbers, which may further include symbols, punctuation, and the like. This combination may provide certain contextual meaning to the input 104. Often, systems may use a rule-based approach to select one of a variety of meanings for a given combination of letters and numbers and proceed along the pipeline, which may disregard the context of the input 104. For examples, letters, numbers, and/or symbols may be used in particular ways given the context of the input 104, where a rule-based approach may disregard or preferentially select only one for processing. By only selecting one of a number of potential meanings, if the selected option is incorrect, all later processing will be unnecessary because the result will be incorrect, which may frustrate a user or provide an illogical output. Various embodiments of the present disclosure may overcome these problems by providing, for use with the processing engine 106 and/or one or more associated systems, a text normalization model and/or an inverse text normalization model (as shown in FIG. 1B) that may use a combination of a rule-based and neural approach in order to evaluate the input 104, determine potential reformulations of the input where symbols and numbers are converted, determine a context of the input, select a potential reformulation of the input where symbols and numbers are converted, and then provide that reformulation for further processing along the pipeline. Improvements to this front-end or early portion of the pipeline in TTS pipelines, or the back-end or post-processing portions of the pipeline for STT, may lead to improved output results and/or less frequency of reprocessing inputs to try and obtain an alternative, more accurate output.

Various embodiments may also include a TTS module 108 that is part of, or associated with, the conversational system 102A. Other modules or processing systems may also be associated with the conversational system 102A, but have been omitted for clarity and conciseness. By way of example, the conversational system 102A may also be associated with, or used along with, a natural language understanding (NLU) system. In embodiments, the NLU system may be used with one or more conversational AI systems to enable humans to interact naturally with devices. The NLU system may be a framework or pipeline that receives, processes, and evaluates different portions of the input 104. For example, the input 104 may be pre-processed (e.g., in TTS) and/or post-processed (e.g., in STT), which may include tokenization, lemmatization, stemming, and other processes, as noted above, which may be part of or separate from the NLU system. Additionally, the NLU system may include one or more deep learning models, such as a BERT model, to support features such as entity recognition, intent recognition, sentiment analysis, and others. Furthermore, the NLU system may allow for conversion of linguistic units of the input 104 into phonemes, which may then be assembled together, such as by using one or more prosody models.

In at least one embodiment, the TTS model 108 may take a text response generated by the NLU system and change it to natural-sounding speech. It should be appreciated that, in various embodiments, a prosody model may be part of the TTS model 108. The output from the NLU system may undergo various processes associated with the TTS model 108, such as linguistic analysis, synthesis, and the like. Additionally, parts of speech may be tagged. In various embodiments, output may be further analyzed for refining pronunciations, calculating the duration of words, deciphering the prosodic structure of utterance, and understanding grammatical information. Additionally, text may be converted to mel-spectograms for output to a vocoder to generate natural sounding speech. As noted above, in various embodiments, the vocoder may be incorporated into the TTS model 108. Accordingly, an audio output 110 is generated that sounds like human speech.

FIG. 1B illustrates an example environment 120 that can be used to provide such functionality in accordance with at least one embodiment. In this example, the environment may be associated with one or more conversational systems 102B, which may include different processing capabilities to receive the input 122 in the form of an auditory input for a STT pipeline. In at least one embodiment, the STT model 112 may take a verbal input, such as an utterance, and then resample the raw audio signals using one or more signal processing techniques, such as standardization, windowing, and/or conversion, among other options. This processing may allow for spectrogram transformation to provide a machine-understandable version of the utterance. One or more acoustic models may be associated with the STT model 112 to consider a spectrogram as an input and produce probability scores for all different vocabulary tokens over different time steps. In various embodiments, one or more neural language models may then be used to add a contextual representation so that a decoder may output the speech in a textual format.

In at least one embodiment, the input 122 for the STT pipeline may be an audio input. The audio input could be a user utterance, an audio recording, an audio recording extracted from a video, and/or the like. The audio recording may be passed to the STT model 112 for conversion to one or more textual outputs, which may then be post-processed using a post-processing module 114. In at least one embodiment, post-processing includes ITN prior to generating an output 124.

In at least one embodiment, one or more machine learning systems, which may be presented in the form of neural language models 116 that are executed using one or more stored parameters may be part of the conversational system 102B to provide the output 124. The neural language models may form a portion of the pre- and/or post-processing modules 106, 114. These models 116 may be general purpose models or language specific models that are pre-trained or part of a service that executes using one or more stored parameters, which may be specified or particularized for certain applications.

Figure 2:
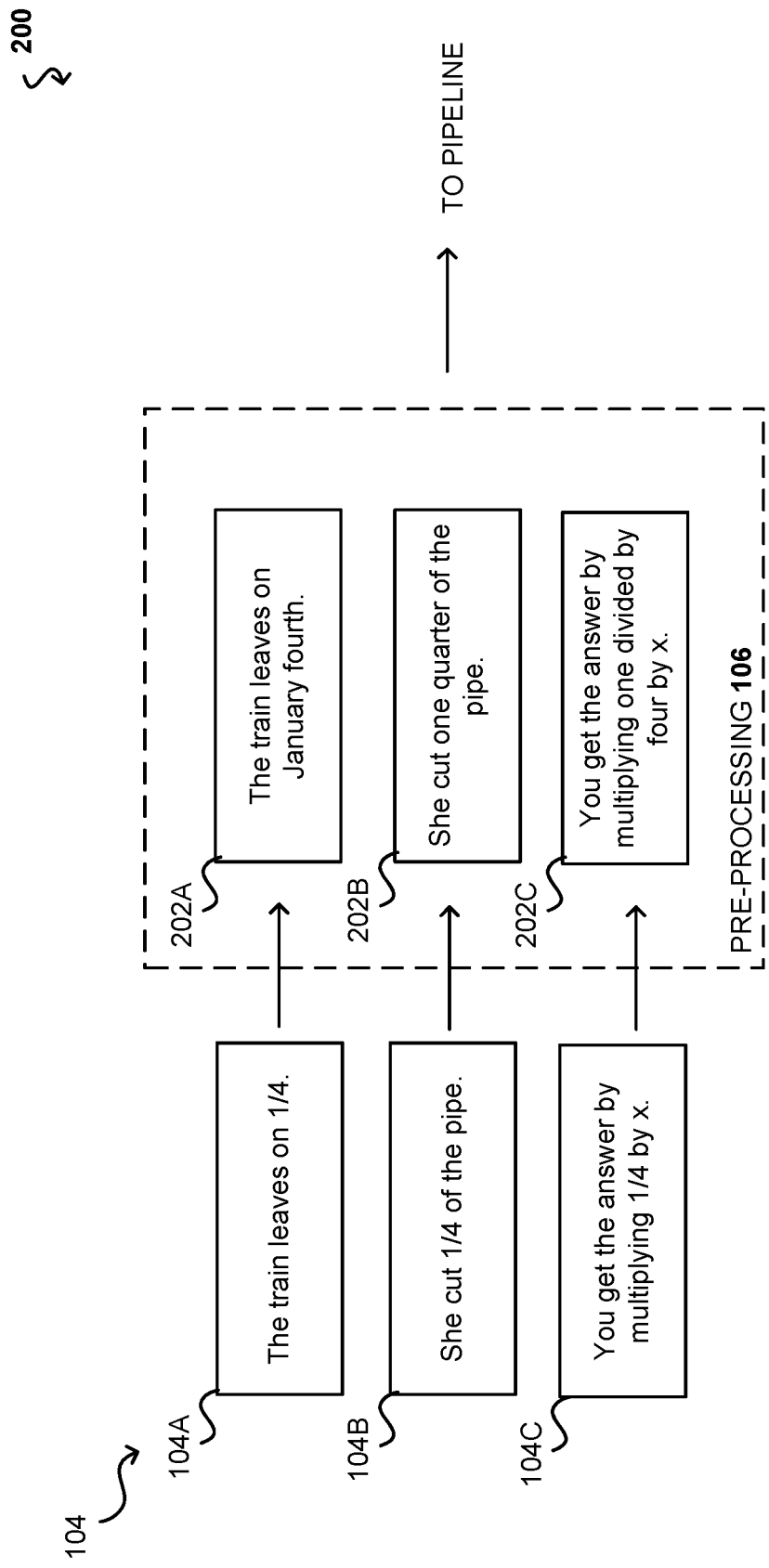
FIG. 2 illustrates an example of a representation of a pre-processing engine of a language system, according to at least one embodiment.

FIG. 2 illustrates an example environment 200 illustrating one portion of the pre-processing engine 106 that may normalize different inputs 104 based on a variety of rules. In this example, the pre-processing engine 106 includes text normalization, where the inputs 104 are evaluated to identify non-character segments, such as numbers, symbols, and/or the like. In this example, a first input 104A includes a mixture of letters (forming words), numbers (one and four), and characters (a forward slash). As will be appreciated, the use of the forward slash can denote a variety of different meanings, such as a separator for dates, division for fractions, file paths for computing systems, as part of a numbering systems (e.g., page 3/53), abbreviations (e.g., input/output, not applicable), slang terminology ("/s" for sarcastic), and a variety of other meanings. Accordingly, one or more rule-based approaches may be used to address the presence of these types of characters because the TTS may require character-only inputs to provide an output.

Text normalization (TN) converts text from the canonical written to the spoken form, which may be incorporated as a pre-processing step in various language applications, such as TTS. For example, sentences may consist of plain and special words or phrases, which may be referred to as semiotic tokens. Semiotic tokens can be grouped into classes like cardinals, fractions, or dates, as noted above. As shown in FIG. 2, semiotic tokens may require non-trivial normalization, while plain words may be maintained.

In this example, the pre-processing engine 106 has converted the inputs 104 to generate normalized inputs 202A-202C. For example, the input 104A is normalized from "The train leaves on 1/4" to "The train leaves on January fourth." Additionally, in this example, the input 104B is normalized from "She cut ¼ of the pipe" to "She cut one quarter of the pipe." Furthermore, the input 104C is normalized from "You get the answer by multiplying ¼ by x" to "You get the answer by multiplying one divided by four by x." However, this correct normalization may only be available if the proper rules are hard-coded into the system and then executed. For example, one rule could be to convert any forward slash to a date. This rule, however, would fail for the input 104B, which would then be normalized to "She cut January fourth of the pipe." Stacking rules may not overcome this problem because the intended use is often context-dependent, which may exceed the capabilities of rules. Furthermore, the different rules may not be useful with different models or with different languages, thereby limiting their applicability and/or requiring extra work or processing to identify appropriate rules for different languages, to hard code those rules into the models, and then to execute and check the rules. Embodiments of the present disclosure may provide a hybrid model for use with pre-processing, such as text normalization, where a set of rules is used to evaluate an input, a list of potential outputs is generated, the outputs are scored, the scored outputs are then provided to a neural LM for re-scoring, and then a final output is selected for processing via one or more pipelines of a conversational system 102A. In this manner, the combination or hybrid approach may allow for a discrete set of rules for use with evaluation of an input and then provide a contextual analysis of a proposed normalization prior to selection of a normalized output for use with a pipeline.

Characteristics of TN vary from those of other processes used in NLP. For example, it may be difficult to collect normalized text for training. Additionally, TN applications often demand low error rates. As noted above, incorrectly normalizing ¼ could lead to outputs that are unintelligible. If such a normalization were based on a rules, re-running the same phrase would not provide improved results. Accordingly, the input would need to be changed, which may not be reasonable in the event that processing is being performed with little to no-human interaction. These types of errors may be considered to be unrecoverable because they alter the input semantic. It should be appreciated that these types of errors may reduce a likelihood that certain industries would adopt these technologies, such as financial services or the like. Furthermore, semiotic tokens often make up a small percentage of a sentence, but may stem from a large variety of semiotic classes.

As noted, TN systems can be rule-based or neural. With traditional rule-based systems, regular expression or weighted finite-state transducers (WFST) are used to define a set of language-specific rules. While these systems may be easy to extend, debug, and reason about, they may not resolve contextual ambiguity without making rules significantly, and often prohibitively, complex. Returning to the example in FIG. 2, rules that determine when "¼" corresponds to "January fourth" or "one quarter" may be challenging to develop based on the contextual uses of the particular semiotic token. On the other hand, neural systems may be used to treat TN like a machine translation task. While these systems may incorporate context, they often need large datasets to scale, which may be difficult to obtain, and they may suffer from an increased error rate.

Embodiments of the present disclosure overcome the drawbacks and errors of existing systems by incorporating a hybrid TN approach that uses rule-based WFST grammars to output (e.g., all, or substantially all) possible normalization options, which are then re-scored with a pre-trained neural LM to resolve contextual ambiguities. Accordingly, approaches incorporating the present embodiments provide the ability to control a system output and prevent certain types of unrecoverable errors, such as hallucinations. Furthermore, the approach is easy to improve and modify normalization capabilities by extending the WFST grammar. Additionally, embodiments may be compatible with off-the-shelf pre-trained LMs. Alternatively, LMs may be adapted as they are trained in a self-supervised fashion without using labeled data. Approaches may be described as using shallow fusion techniques of WFST and neural LMs to TN.

Figure 3:
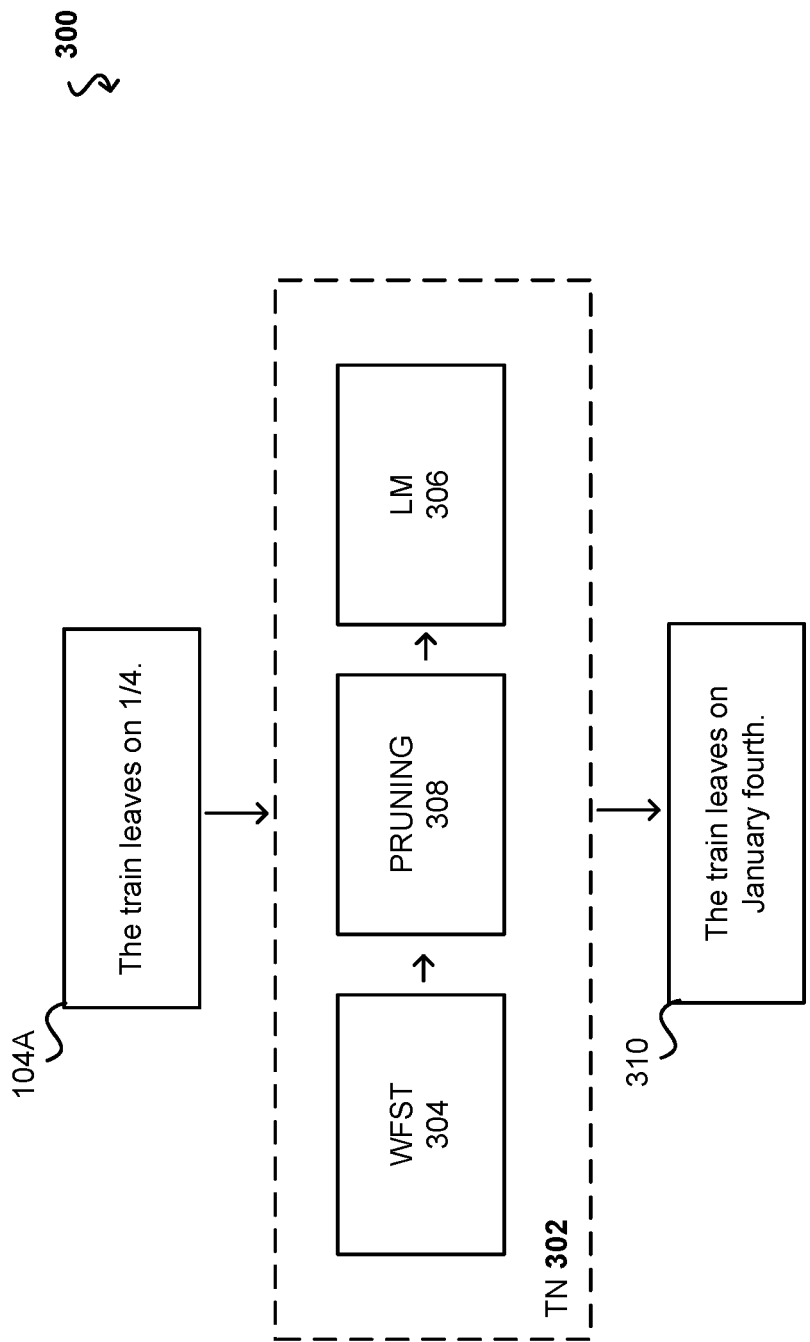
FIG. 3 illustrates an example schematic diagram of a text normalization system, according to at least one embodiment.

FIG. 3 illustrates an example environment 300 with a TN system 302 that may use a combination of a WFST 304 and LM 306 (e.g., a neural LM) to generate an output that applies both a rule-based approach to normalize semiotic tokens while also identifying a context of the input. The TN system 302 may correspond to, or include overlapping features with, the pre-processing module 106. In this example, the input 104A is provided to the TN system 302. The TN system 302 may form a portion of a language pipeline, such as for a TTS or STT system. This examples illustrates TN within the TTS system, where a word is converted from its written form to a spoken form.

In at least one embodiment, the WF ST 304 is a deterministic WFST. A path through the WFST may map an input sequence to an output sequence, where each transduction (e.g., arc) has an associated weight w. A path's weight W is the sum of all of the arcs' weights. One approach to text normalization based on WF ST is to output the shortest path which has the minimum weight which can be found in NeMo text normalization framework from NVIDIA Corporation, which does not take context into account.

Various embodiments of the present disclosure may also use a non-deterministic WFST and more than just the shortest path in the WFST. This may be advantageous in cases where the textual input has ambiguous semiotic tokens. Such an approach may eliminate redundancy of semantically equivalent normalization forms. For example, regarding the input 104A, an output of "January fourth" and "the fourth of January" is semantically equivalent. However, embodiments may wish to evaluate various (e.g., every or substantially every) semiotic token normalizations. To that end, the WF ST may assign higher weights to a path that keeps the token unchanged. For example, a first weight (e.g., 100) may be assigned for an unchanged word and a lower weight (e.g., 2) may be assigned for punctuation. All arcs that normalize a semiotic token may have weights $w \in [1.0, 1.01]$. As a result, unwanted options can be pruned by enforcing a threshold on their respective paths' weights. In at least one embodiment, a pruning module 308 may be incorporated with the WF ST 304 and/or be part of the LM 306. Alternatively, as shown, the pruning module 308 may be separately provided and tuned for different applications.

As an example, a given input has k semiotic tokens, and S is the set of possible normalization options, where $w_{s,k}$ is the weight of the k-th token of the normalization option s. Then, all weights $W_s$ for $s \in S$ satisfy Equation 1:

$$W_s = C + \Sigma_k w_{s,k} \leq C + k \cdot 1.01 = C + k \cdot 1.0 + k \cdot 0.01 \quad (1)$$

where C is the total weight of all non-semiotic tokens. In an example, k is assumed as less than or equal to 20. Thus, to keep only outputs with weights within 0.2 of the shortest path, Equation 2 may be enforced:

$$C + k \cdot 1.0 + k \cdot 0.01 \leq \min_{s \in S} W_s + k \cdot 0.01 \quad (2)$$
$$\leq \min_{s \in S} W_s + 20 \cdot 0.01$$
$$\leq \min_{s \in S} W_s + 0.2$$

Accordingly, systems and methods may use the WFST 304 in order to receive an input, output (e.g., all or substantially all) possible outputs based on one or more sets of rules, weight the outputs, and then prune the results. In at least one embodiment, the inputs may be tagged or otherwise identified to determine which rules to apply. For example, one or more rules may be generated to identify fractions or dates. Additionally, in at least one embodiment, a set of rules may be used with particular symbols or characters. In this manner, the system may be tuned with particularly selected and established rules. It should be appreciated that this tuning may be done by a particular user or entity and may be specific to institutional requirements. However, in various embodiments, a database of potential rules may be available and one or all of the rules may be applied to different WFSTs used with different scenarios.

Different inputs may be tagged as being associated with different classes and then potential normalization outputs may be limited to one per class, as noted above. This limitation may reduce redundancies, thereby increasing speeds for downstream processes. By way of example only, the symbol "$" may be preferentially weighted to be "dollars" and not "dollar-sign" or ".com" may be preferentially weighted to be "dot-com" and not "period com." These default rules and enforcements within particular classes may reduce a total output without changing the meaning of the inputs. In some embodiments, an input text may have any potential number of outputs. For example, the number of potential rules, number of semiotic tokens, and/or the like may affect a total number of outputs. Systems and methods may initially begin eliminating or reducing a number of outputs prior to pruning in order to improve speeds and reduce memory use for the system.

Various outputs may provide the pruned WFST output options to the LM 306 for re-scoring. A variety of different LMs may be used with embodiments of the present disclosure, such as an autoregressive language model or a masked language model, among other options. For autoregressive LMs, rescoring may be based on perplexity. For mask LMs, scoring may be the average of pseudo-log-likelihood scores calculated by masking input tokens one by one. This score calculation may be modified when an input sentence contains multiple semiotic tokens that require normalization. For example, to minimize bias, all but one semiotic token can be excluded from context. As a result, only a single semiotic option may be provided when calculating the score, while the rest of the semiotic tokens in question are masked. The scores for each masked variant are then averaged to get an aggregated value for the sentence. As an example, an input of "What's <one half> cup plus <two thirds> cup?" that includes two semiotic tokens (e.g., one half and two thirds) would first calculate weight for "What's [MASK] cup plus two thirds cup?" and then "What's one half cup plus [MASK] cup?" The average may be used to score the sentence.

Using the LMs for the present system may simplify training, because obtaining training data for LMs that do not include semiotic tokens may be easier than finding training data where semiotic tokens are included. As a result, a specific LM may not be needed for various embodiments, and any appropriate trained neural LM can be used in embodiments of the present disclosure. After rescoring, the highest-scoring option may be selected for the output 310 (e.g., output of the TN 302), which may then be passed along the pipeline to generate an output.

Figure 4A:
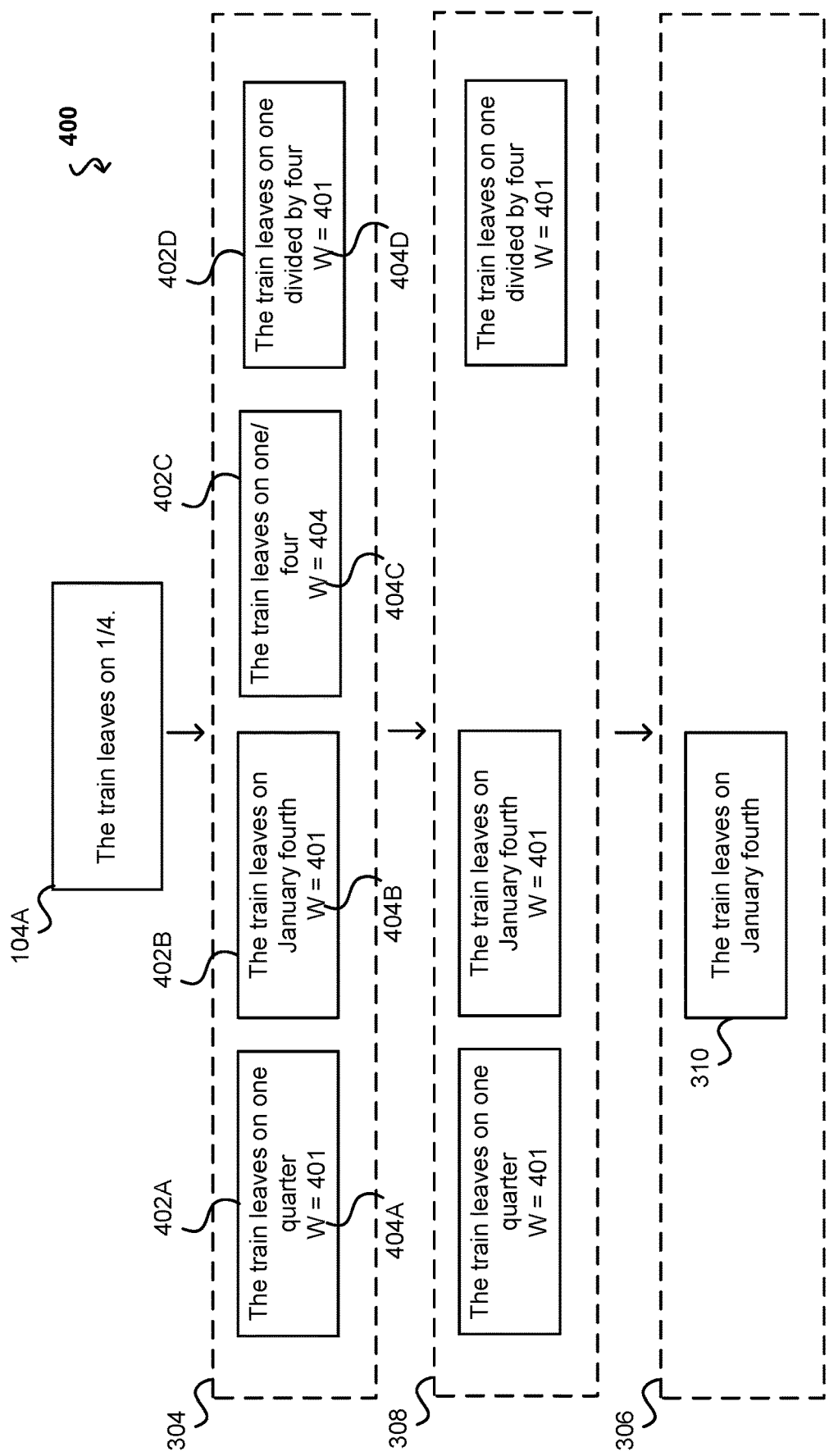
FIG. 4A illustrates an example schematic diagram of a text normalization system, according to at least one embodiment.

FIG. 4A is an example environment 400 illustrating the TN 302 executing the WFST 304, pruning module 408, and LM 306 to generate a normalized output 310. In this example, the input 104A is provided to the system at the WFST 304. The input text may be scanned to identify one or more semiotic tokens, which in this case is "¼." As shown, this token includes a mixture of both symbols and numbers, but may be identified as being associated with one or more classes, which can be based on a different rule being applied to inputs. In this example, there are four rules that are deemed appropriate for generating the intermediate normalizations 402A-402D. For example, a first rule interprets the semiotic token "¼" as a fraction that has a certain pronunciation (e.g., one quarter as opposed to one fourth). A second rule, however, interprets the same token as a date. The third rule also interprets the token as a fraction, but uses an alternative pronunciation. One quarter" and "one fourth" are not necessarily duplicates of one another and may have different contextual meanings, and therefore, they are defined within a different class and not eliminated as being duplicative, as noted above. For example, one quarter may be used to describe a time or a measurement (e.g., a quarter until 4 or one quarter cup) while one fourth is used as a mathematic description. A fourth rule is shown to parse out each portion of the semiotic token, but to describe the relationships indicated by the forward slash (e.g., "divided by"). It should be appreciated that these rules are provided only as examples and different sets of rules or classes may be used in alternative embodiments.

Each intermediate normalization 402A-402D is associated with a weight 404A-404D. In embodiments, the weighting may be based on the use of either a deterministic or non-deterministic WFST, as noted above. The weights 404A-404D may be used by the pruning module 308 to eliminate a lowest option and/or any options exceeding a threshold. The threshold may be a particularly defined weight score or may be based on other scores. For example, in this case, the threshold may be 402, and as a result, the intermediate normalization 402C is removed at the pruning module 308. However, in other embodiments, the threshold may be set to be a certain percentage or value greater than a lowest weight, for example, or another appropriate value.

The remaining intermediate normalizations 402A, 402B, 402D are then processed using the LM 306 to evaluate the semiotic tokens in context. As shown, the first and fourth intermediate normalizations 402A, 402D are eliminated by the LM 306 after the rescoring to select the best remaining option for further processing within the pipeline. Accordingly, systems and methods allow for a variety of alternative representations of an input to be evaluated for potential use within a language pipeline.

Figure 4B:
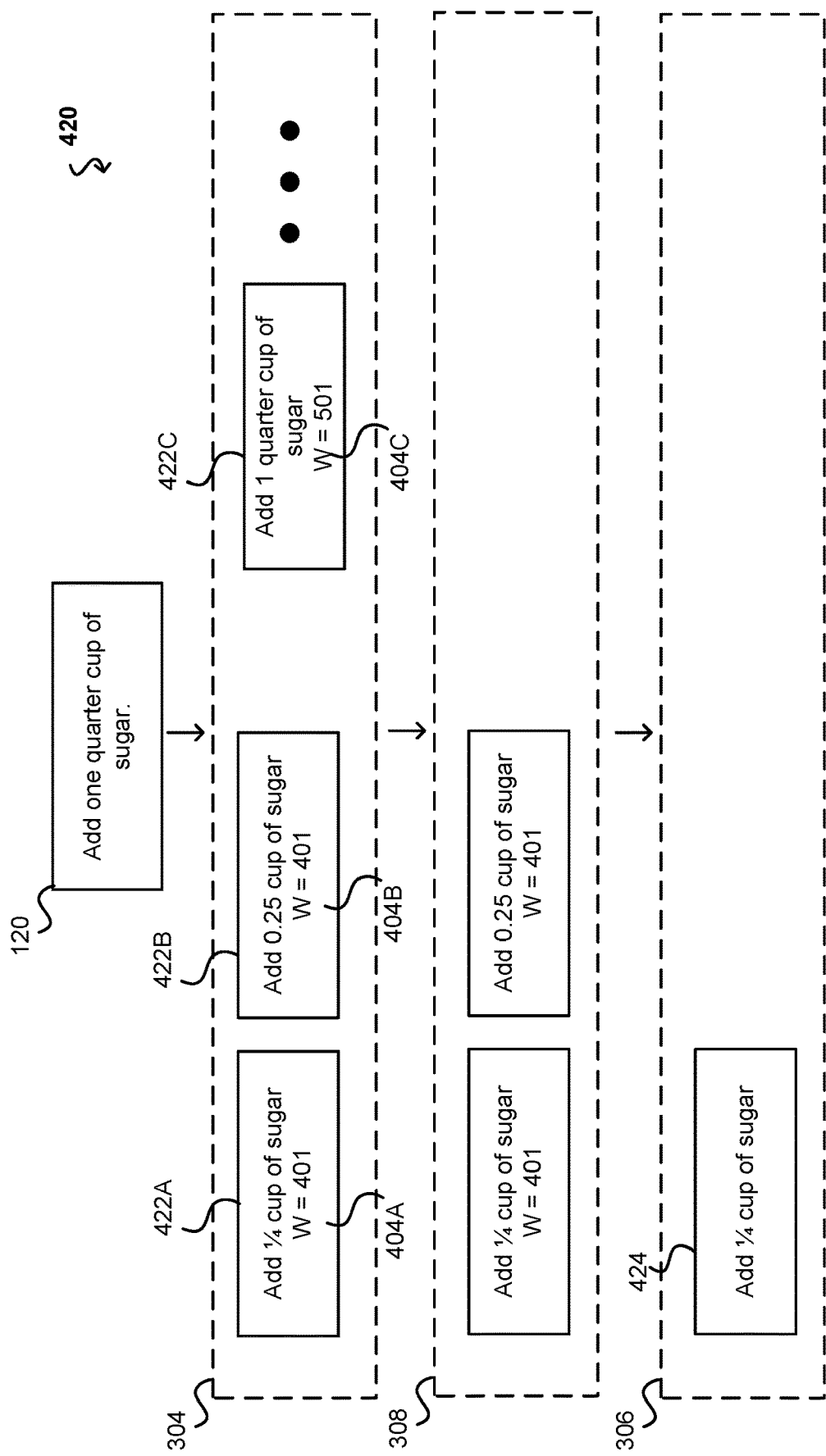
FIG. 4B illustrates an example schematic diagram of an inverse text normalization system, according to at least one embodiment.

Various embodiments of the present disclosure can be used to generate inputs for use within a TTS or STT system. Additionally, systems and methods may be used to generate outputs that include semiotic tokens using ITN. For example, for a STT system, it may be more natural for a user to visualize the textual output including semiotic tokens. Accordingly, various embodiments may also be used to receive an input that only includes characters, generate potential intermediate outputs, evaluate the outputs based on context, and then generate an output that may be used within a language pipeline. FIG. 4B illustrates an example environment 420 illustrating the TN 302 executing the WFST 304, pruning module 408, and LM 306 to generate an output 424 that includes one or more semiotic tokens. In this example, the input 120 includes an input that does not include any semiotic tokens. For a SST system, the input may be an auditory input that is converted to a textual input for processing. However, the use of the tokens may be more pleasing or easier to understand to users, particularly when the output 424 is a textual output. Accordingly, embodiments, may use the WF ST 304, pruning module 408, and LM 306 to convert the input 120 into the output 424 including one or more semiotic tokens.

In this example, the input 120 is provided to the WFST 304, which may include a different set of rules compared to FIG. 4A. In this example, different intermediate outputs 422A-422C are provided that insert semiotic tokens in the place of "one quarter." For example, in the first intermediate output 422A, "¼" is used to replace one quarter. As shown, the rules may modify how the information is presented, with the second intermediate output 422B including a decimal point, the third intermediate output 422C mixing the number "1" and the word quarter. As noted above, these outputs 422A-422C are weighted and then pruned at the pruning module 308 based on different pruning criteria. Thereafter, the LM 306 may re-evaluate the context of the input 104A and/or the intermediate outputs 422A, 422B to select the first intermediate output 422A for use as the output 424.

Figure 5A:
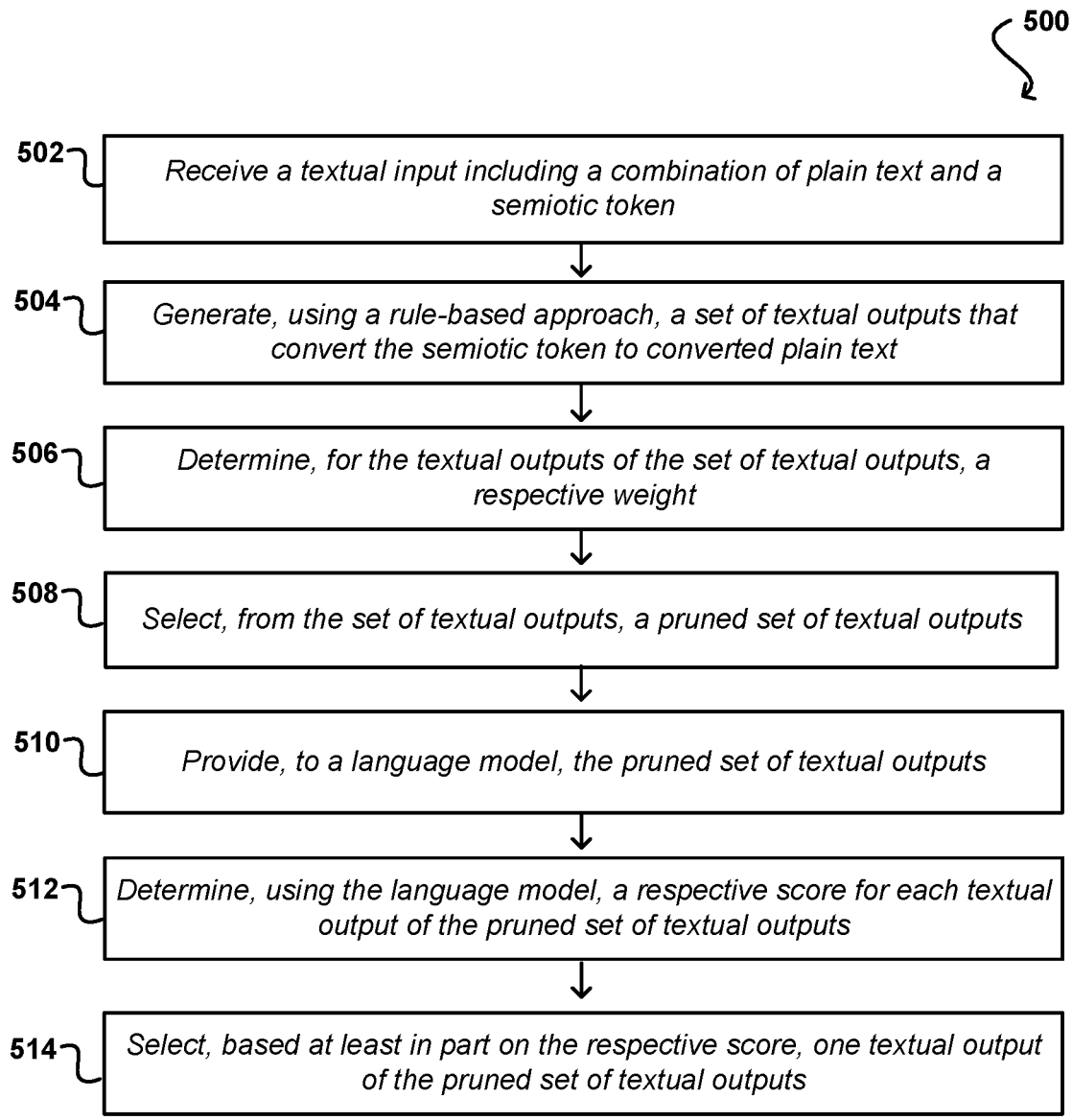
FIG. 5A illustrates an example flow chart of a process of text normalization, according to at least one embodiment.

FIG. 5A illustrates an example process 500 for normalizing a textual input. It should be understood that for this and other processes presented herein that there can be additional, fewer, or alternative steps performed in similar or alternative order, or at least partially in parallel, within the scope of various embodiments unless otherwise specifically stated. In this example, a textual input is received 502. The textual input includes at least some plain text (e.g., words, letters, etc.) and at least one semiotic token (e.g., numbers, characters, symbols, etc.). For example, the input can include a sentence that includes a number. For a TTS system, this input would include the plain text and the at least one semiotic token in written form.

In at least one embodiment, the textual input is used to generate a set of textual outputs based, at least in part, on one or more rules 504. The rules may be specifically tailored to different categories or classes such that the semiotic token is converted into plain text (e.g., only letters). For example, as noted above, "¼" may be converted to "one fourth" or "one quarter" or "January fourth," among other options. The rules may be based on certain portions of the semiotic token, such as particular rules for numbers, symbols, etc. Additionally, the rules may be based on a format of the semiotic token, such as NUMBER FRONTSLASH NUMBER corresponding to a date. It should be appreciated that there may be multiple different rules that correspond to a same format of the semiotic token, including the above example corresponding to a date and to a fraction.

Each textual output forming the set of textual outputs may be analyzed so that a weight may be determined 506. Various embodiments include a WFST, that may be deterministic or not, to determine the weights. As an example, the weights may be based on a lattice normalization option that follows a path, but it should be appreciated that other methods may also, or alternatively, be used. The set of textual outputs may be pruned so that a pruned set of textual outputs is selected 508. Pruning may include evaluating the weights of each of the textual outputs and disregarding outputs having a weight higher than a threshold, for example. In at least one embodiment, if the textual input contains more than one semiotic token, one or more modified options are generated where ambiguous semiotic tokens are masked apart from one another.

In at least one embodiment, the pruned set of textual outputs is provided to a LM 510. Pruning may be based on the weight previously determined. The (e.g., neural) LM may be trained to determine context of the textual outputs of the pruned set of textual outputs and to compute a score for each textual output 512. A best scoring output may then be selected for use within a language pipeline 514.

Figure 5B:
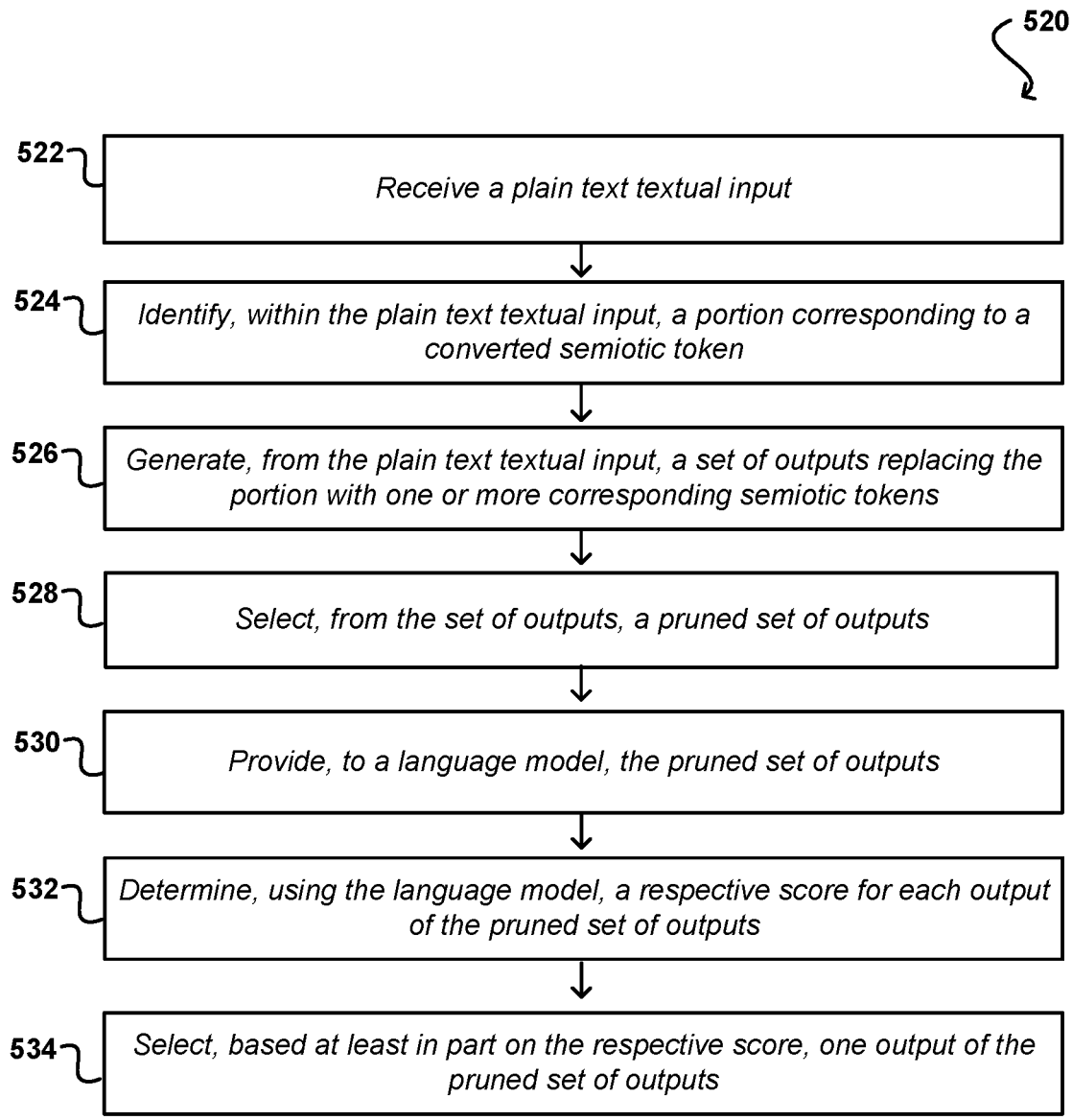
FIG. 5B illustrates an example flow chart of a process of inverse text normalization, according to at least one embodiment.

FIG. 5B illustrates an example process 520 for adding a semiotic token to a textual output. In this example, a textual input is received 522. The textual input may be a plain text input, but the plain text, or portions thereof, my include converted semiotic tokens. For example, a textual input of "Add one quarter cup of sugar" may include the converted semiotic token "one quarter," which can also be represented as "¼." The converted semiotic token may be identified 524 and then one or more rules may be used to convert the plain text input into a mixed output or a set of mixed outputs that includes both plain text and the semiotic token 526.

Each output forming the set of outputs may be analyzed so that a weight may be determined, for example via a WFST, and the set of outputs may be pruned so that a set of pruned outputs is selected 528. Pruning may include evaluating the weights of each of the textual outputs and disregarding outputs having a weight higher than a threshold, for example. In at least one embodiment, if the textual output contains more than one ambiguous semiotic token, one or more modified options are generated where ambiguous semiotic tokens are masked apart from one another.

In at least one embodiment, the pruned set of outputs is provided to a LM 530. The LM may be trained to determine context of the outputs of the pruned set of outputs and to compute a score for each output 532. A highest or best scoring output may then be selected for use within a language pipeline 534.

Figure 6:
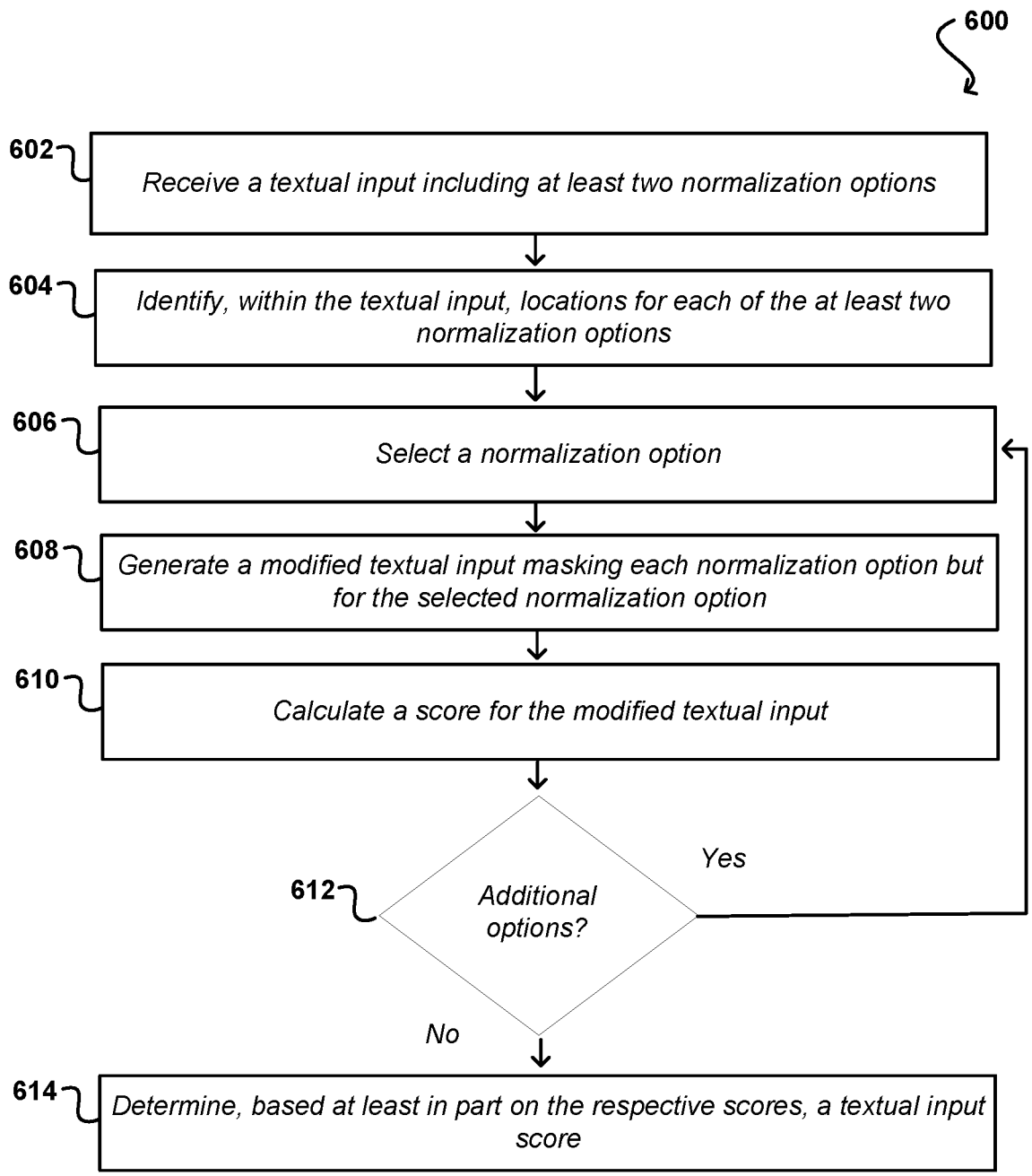
FIG. 6 illustrates an example flow chart of a masking process for normalizing a textual input, according to at least one embodiment.

FIG. 6 illustrates an example process 600 of determining a mask score for a textual input. In this example, a textual input is received 602, where the input includes at least two normalization options. In an embodiment, the input may include an already normalized textual input where the original input had at least two ambiguous semiotic tokens, each of them having at least two normalization options that may be ambiguous. For example, the input may correspond to a sentence where two different portions of segments include normalization options. By way of example, the sentence "Add two third cups flour to one fourth cup cold butter" would include the normalization options of "two third" and "one fourth." Locations corresponding to the normalization options may be determined 604 so that one or more masks can be generated to replace one normalization option during analysis, thereby reducing an influence of one over the other. That is, the mask may lead to evaluations using single normalization options (e.g., ambiguous semiotic options).

In at least one embodiment, a normalization option is selected 606 and a modified textual input is generated where all normalization options within the textual input, but for the selected normalization option, are masked 608. For the example sentence above, if "two third" were the selected normalization option, the modified textual input would be "Add ⅔ cups flour to [MASK] cup cold butter." A score may then be calculated for the modified textual input 610. It may be determined whether additional normalization options are present within the textual input 612, and the process may be repeated so that each normalization option is separately evaluated and scored. If there are no remaining normalization options, a textual input score is determined 614, which may be an average of each of the individual modified textual input scores, by way of example.

Data Center

Figure 7:
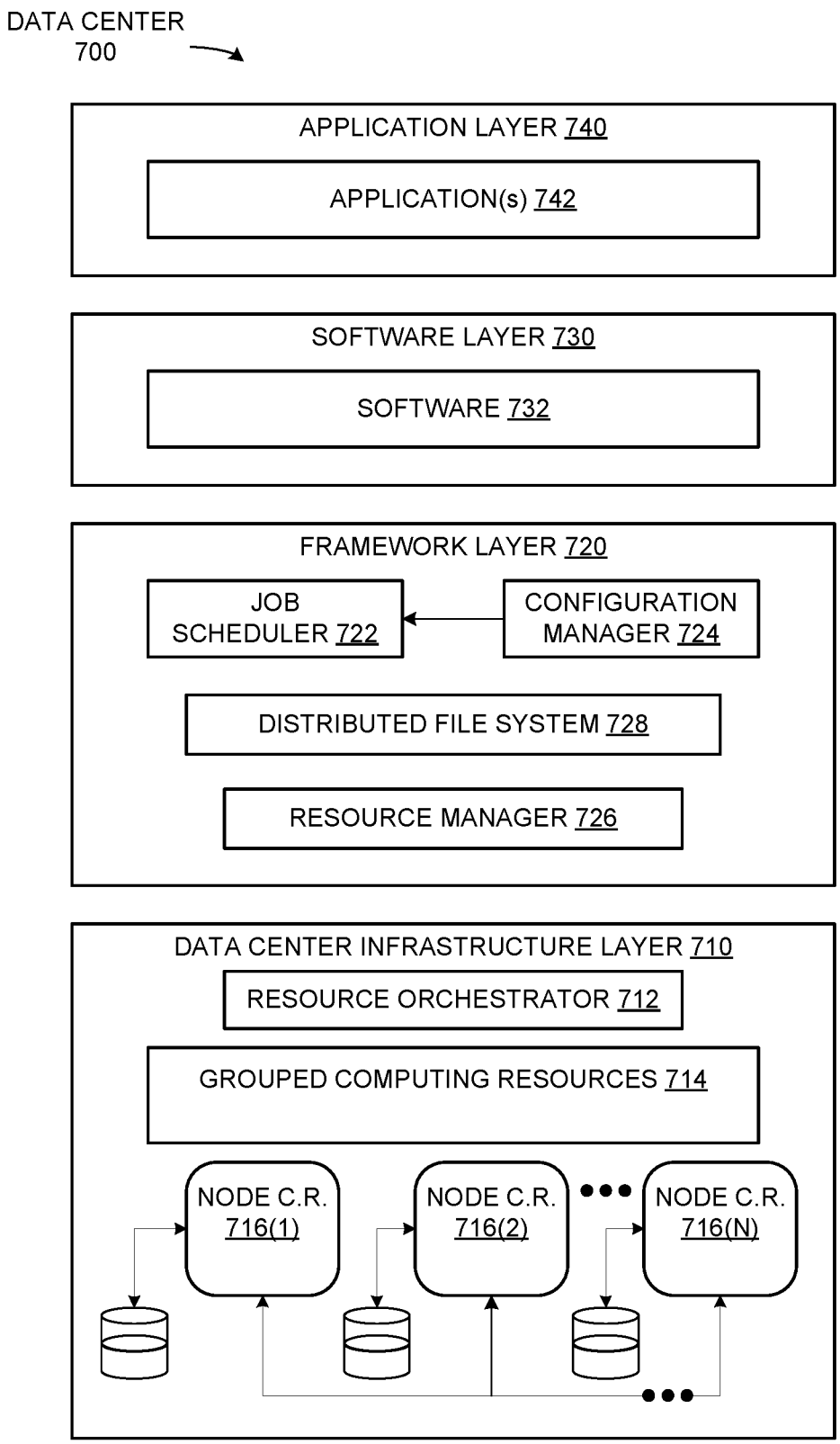
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for text normalization.

Computer Systems

Figure 8:
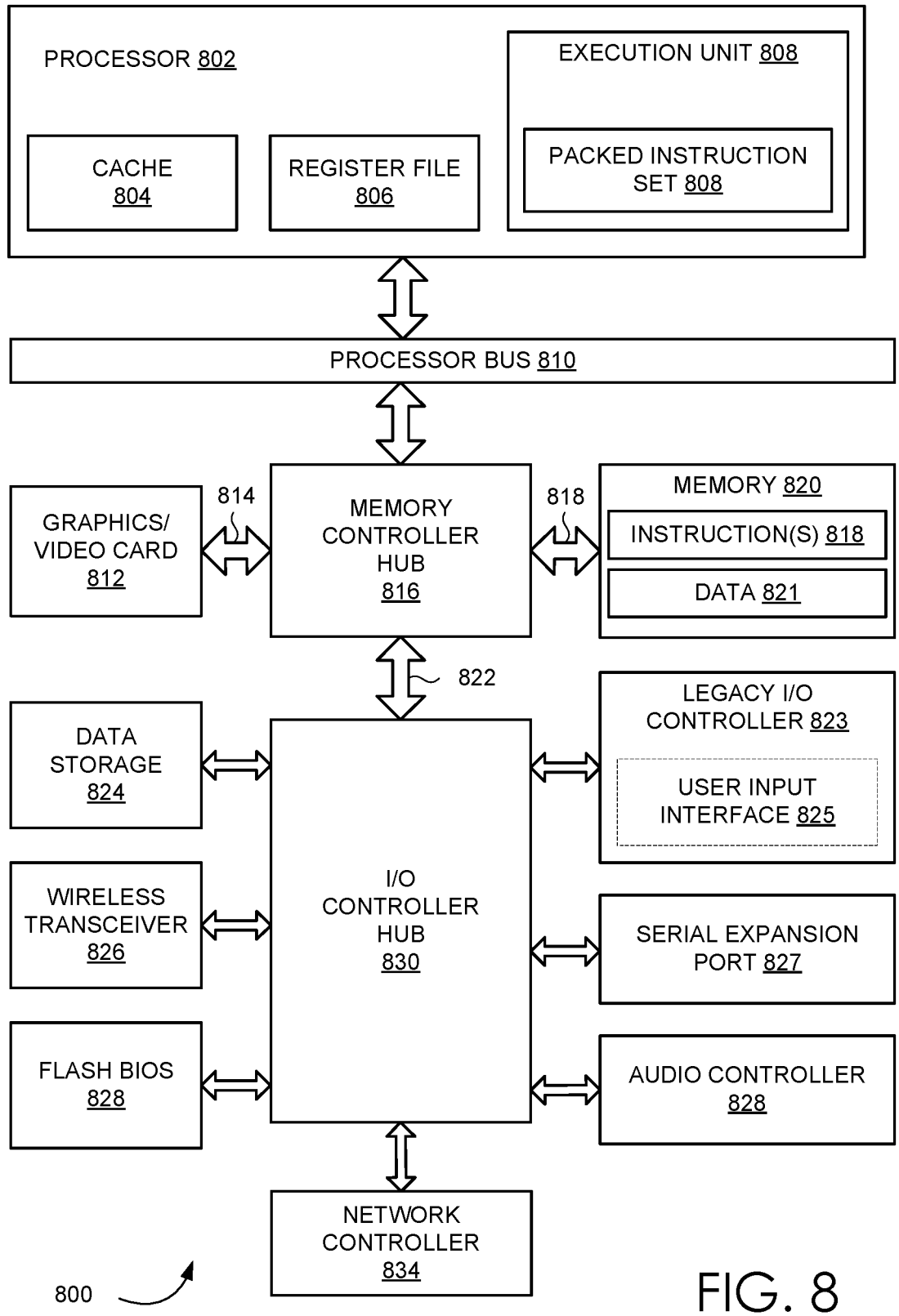
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

Embodiments of the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be incorporated or integrated in a variety of different systems such as automotive systems (e.g., a human-machine interface for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for text normalization.

Figure 9:
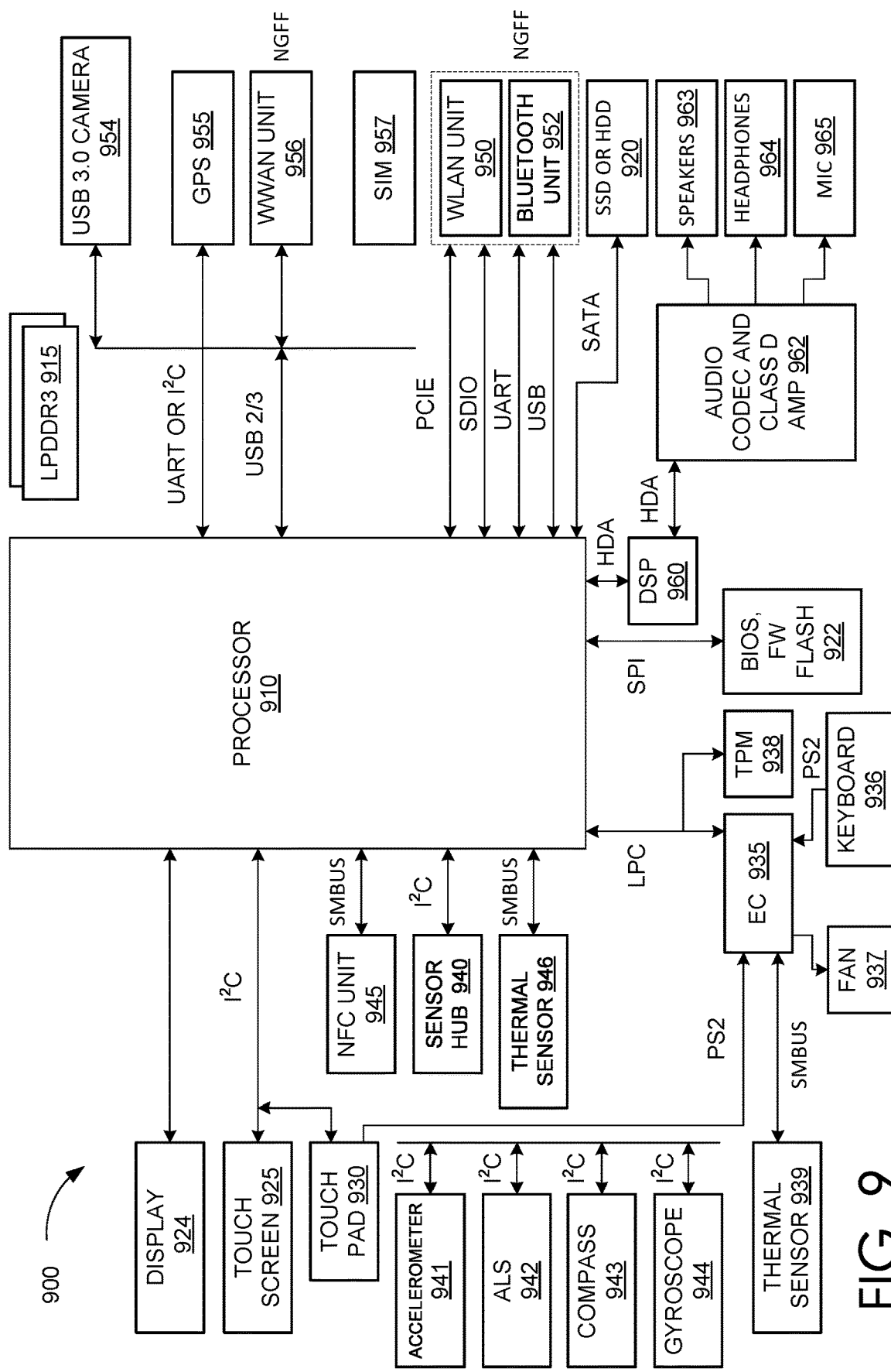
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for text normalization.

Figure 10:
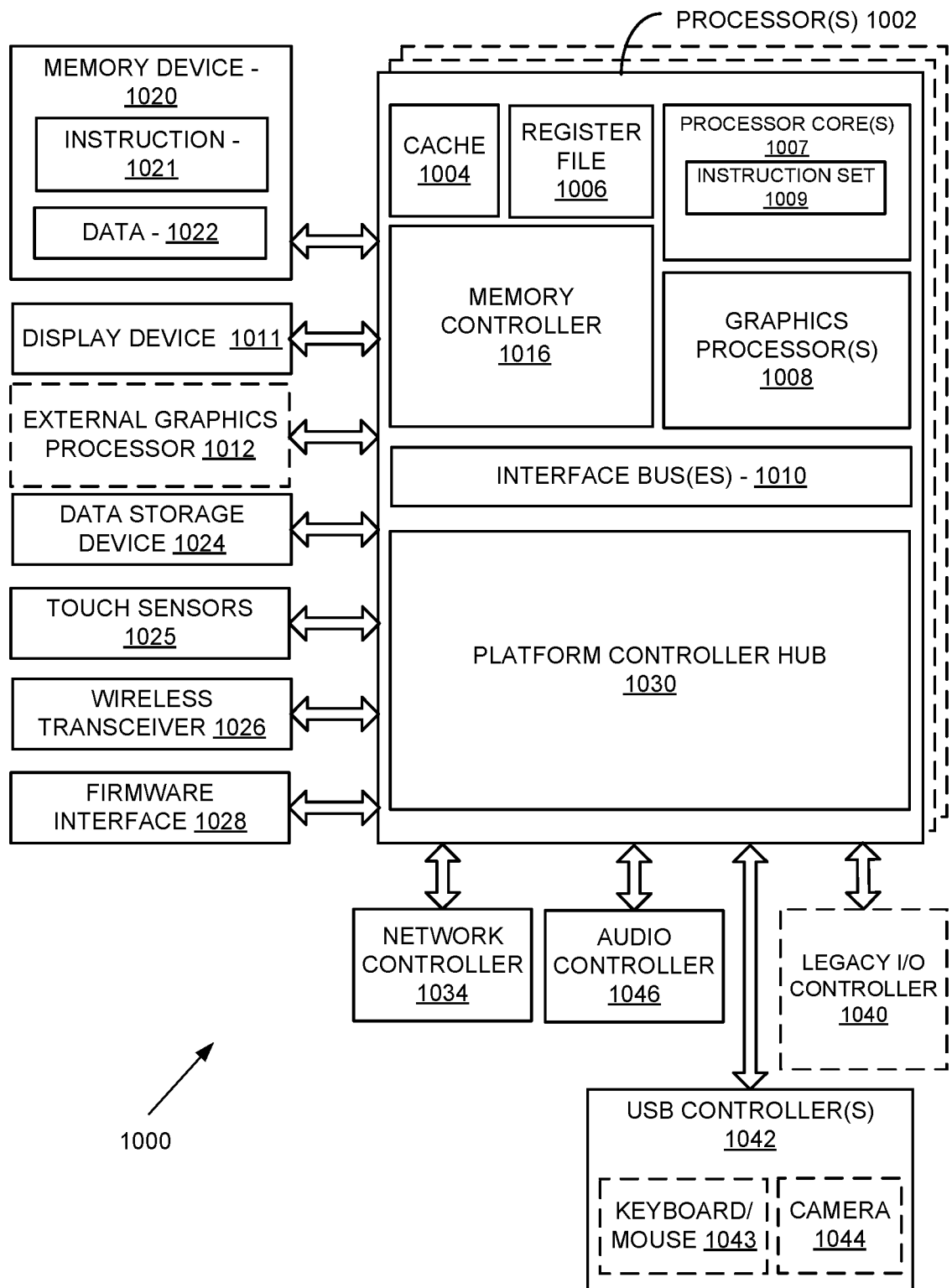
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for text normalization.

Figure 11:
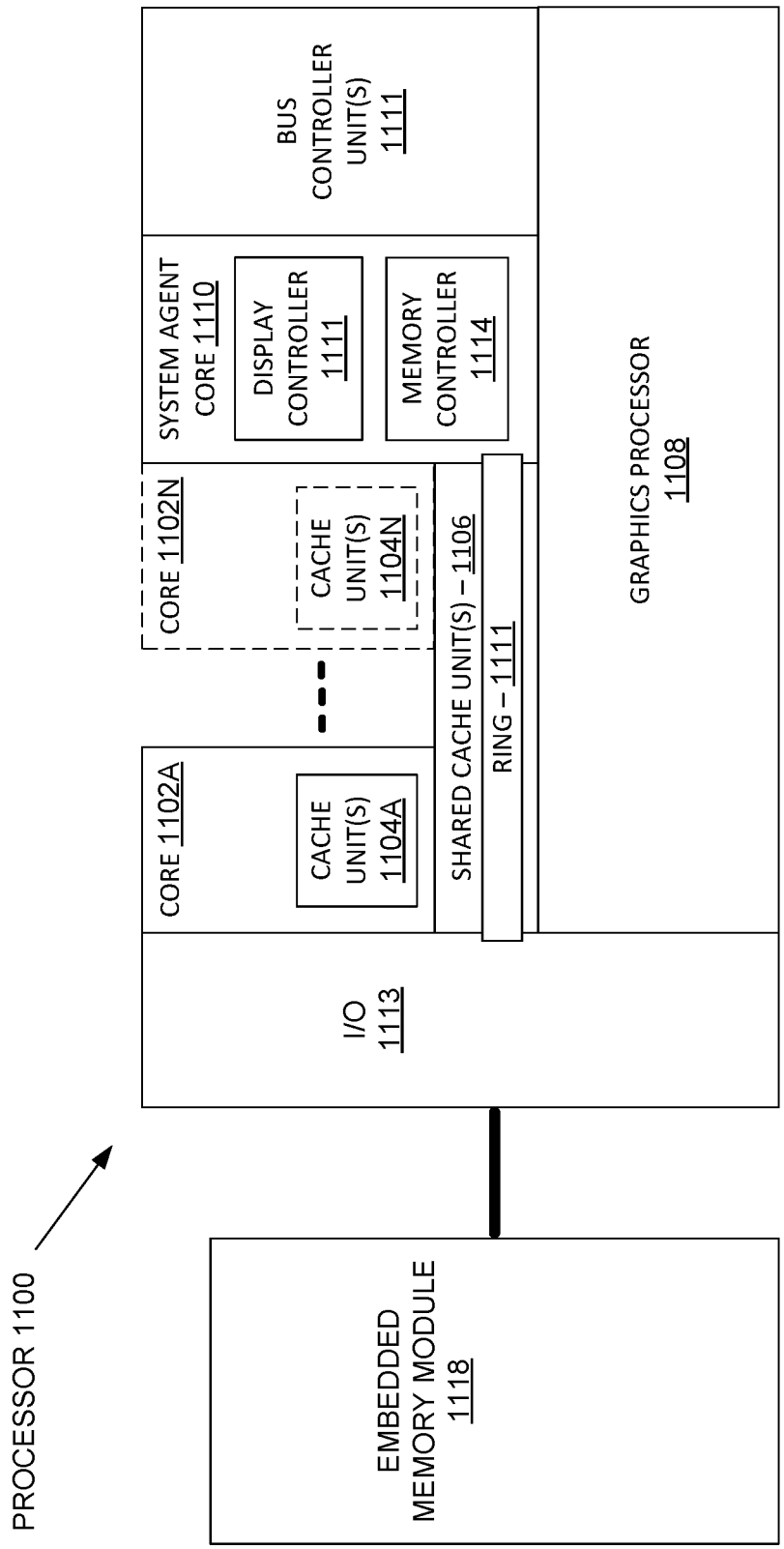
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for text normalization.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
receiving an input including one or more tokens;
generating, using one or more rule-based algorithms, a set of one or more plain text representations corresponding to the one or more tokens;
determining, using the one or more rule-based algorithms and for at least one individual plain text representation of the set of one or more plain text representations, one or more weights;
determining, from the set of one or more plain text representations and based at least in part on comparing the one or more weights to one or more thresholds, a subset of one or more plain text representations; and
selecting, using a trained language model, a plain text representation from the subset of one or more plain text representations.

2. The method of claim 1, wherein the one or more tokens correspond to one or more classes including at least one of a number, a letter, a symbol, a fraction, or a date.

3. The method of claim 1, further comprising providing the plain text representation to a text-to-speech system.

4. The method of claim 1, further comprising generating a set of one or more rules corresponding to at least one token of the one or more tokens, wherein the one or more rule-based algorithms use the set of one or more rules.

5. The method of claim 1, wherein the one or more weights are determined using a weighted finite-state transducer.

6. The method of claim 1, wherein:
the input further includes plain text;
the plain text representation and the plain text are combined to generate a text string; and
the method further comprises sending the text string to a text-to-speech application.

7. The method of claim 1, further comprising:
determining, for the set of one or more plain text representations, one or more classes for individual plain text representations; and
selecting, for at least one individual class of the one or more classes, a class-specific plain text representation from the set of one or more plain text representation.

8. A processor, comprising:
one or more processing units to:
generate a weighted set of one or more textual outputs from an input including a token and plain text;
determine, based at least in part on respective weights corresponding to textual outputs of the set of one or more textual outputs, a modified set of one or more textual outputs;
determine, using a language model, respective scores for textual outputs of the modified set of one or more textual outputs; and
provide, to a text-to-speech component, a textual output of the modified set of one or more textual outputs having a score higher than at least one other textual output of the modified set of one or more textual outputs.

9. The processor of claim 8, wherein the respective weights are determined based at least in part on one or more rules corresponding to a classification of the token within the input.

10. The processor of claim 8, wherein the one or more processing units are further to:
identify a first token within the input;
identify a second token within the input;
generate a first modified input including the first token and a first mask to replace the second token;
determine a first score for the first modified input;
generate a second modified input including the second token and a second mask to replace the first token;
determine a second score for the second modified input; and
determine a final input score based at least in part on the first score and the second score.

11. The processor of claim 8, wherein the respective weights are determined using a weighted finite-state transducer.

12. The processor of claim 8, wherein the language model includes one or more neural networks.

13. The processor of claim 8, wherein the modified set of one or more textual outputs is determined based at least in part on comparing the respective weights to one or more thresholds.

14. The processor of claim 13, wherein the one or more thresholds are tunable.

15. The processor of claim 13, wherein the one or more thresholds are determined dynamically based at least in part on a lowest weight of the respective weights.

16. A system, comprising:
one or more processors comprising processing circuitry to generate, using a processing sequence including one or more rule-based algorithms and one or more machine learning algorithms, a plain text output from an input including one or more tokens.

17. The system of claim 16, wherein the system comprises at least one of:
a system for performing simulation operations;
a system for performing simulation operations to test or validate autonomous machine applications;
an infotainment system of a machine;
an entertainment system of a machine;
a system for generating synthetic data;
a system for collaborative content creation of multi-dimensional assets;
a system for performing digital twin simulation;
a system for presenting at least one of virtual reality content, augmented reality content, or mixed reality content;
a system for rendering graphical output;
a system for performing deep learning operations;
a system implemented using an edge device;
a system incorporating one or more Virtual Machines (VMs);
a system implemented at least partially in a data center; or
a system implemented at least partially using cloud computing resources.

18. The system of claim 16, wherein:
the one or more rule-based algorithms are used to determine one or more weights for a set of one or more plain text output representations, and to prune, based at least in part on comparing the one or more weights to one or more thresholds, the set of one or more plain text output representations to generate a subset of one or more plain text output representations; and
the one or more machine learning algorithms are used to select the plain text output from the subset of one or more plain text output representations.

19. The system of claim 18, wherein the one or more weights are determined using a weighted finite state transducer.

20. The system of claim 16, wherein the plain text output is used by a text-to-speech algorithm to generate synthetic speech.

* * * * *